(12) United States Patent
Huang et al.

(10) Patent No.: US 11,215,402 B2
(45) Date of Patent: Jan. 4, 2022

(54) HEAT DISSIPATION MODULE AND PROJECTION DEVICE

(71) Applicant: Coretronic Corporation, Hsin-Chu (TW)

(72) Inventors: Wen-Jui Huang, Hsin-Chu (TW); Jhih-Hao Chen, Hsin-Chu (TW); Tsung-Ching Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 20 days.

(21) Appl. No.: 16/888,841

(22) Filed: May 31, 2020

(65) Prior Publication Data

US 2020/0386490 A1 Dec. 10, 2020

Related U.S. Application Data

(60) Provisional application No. 62/857,291, filed on Jun. 5, 2019.

(30) Foreign Application Priority Data

Jul. 19, 2019 (CN) .......................... 201910652960.9

(51) Int. Cl.
*F28D 15/00* (2006.01)
*F28D 15/02* (2006.01)
*F28F 1/32* (2006.01)

(52) U.S. Cl.
CPC ............ *F28D 15/0275* (2013.01); *F28F 1/32* (2013.01); *F28F 2215/04* (2013.01)

(58) Field of Classification Search
CPC ...... F28D 15/0275; F28F 1/32; F28F 2215/04
(Continued)

(56) References Cited

U.S. PATENT DOCUMENTS

2004/0105233 A1* 6/2004 Lai .......................... H05K 7/202
 361/695
2007/0109788 A1 5/2007 Pan
(Continued)

FOREIGN PATENT DOCUMENTS

| CN | 1066577 | 5/2001 |
| CN | 202304514 | 7/2012 |
| CN | 210072299 | 2/2020 |

OTHER PUBLICATIONS

Office Action of China Counterpart Application, dated Jun. 8, 2021, pp. 1-8.

*Primary Examiner* — Davis D Hwu
(74) *Attorney, Agent, or Firm* — JCIPRNET

(57) ABSTRACT

A heat dissipation module is configured to dissipate heat generated by at least one heating element of a projection device. The heat dissipation module includes at least one first heat pipe, at least one second heat pipe and a heat dissipation fin assembly. The first heat pipe includes a first section connected to the heating element and a second section. The second heat pipe includes a third section connected to the heating element and a fourth section. The length of the first heat pipe is less than that of the second heat pipe. The heat dissipation fin assembly includes a plurality of heat dissipation fins. The second section and the fourth section pass through the heat dissipation fin assembly, and the number of heat dissipation fins through which the second section passes is 70% or below of the number of heat dissipation fins through which the fourth section passes.

20 Claims, 8 Drawing Sheets

(58) Field of Classification Search
USPC .................................................. 165/104.19
See application file for complete search history.

(56) References Cited

U.S. PATENT DOCUMENTS

| | | |
|---|---|---|
| 2008/0142192 A1* | 6/2008 | Yu .......................... H01L 23/427 |
| | | 165/80.3 |
| 2009/0050305 A1 | 2/2009 | He et al. |
| 2010/0053567 A1 | 3/2010 | Lian et al. |
| 2018/0283797 A1* | 10/2018 | Tochigi ................. H01L 23/427 |
| 2020/0326131 A1* | 10/2020 | Hikichi ............... F28D 15/0275 |

* cited by examiner

HEAT DISSIPATION MODULE AND PROJECTION DEVICE

CROSS-REFERENCE TO RELATED APPLICATION

This application claims the priority benefit of U.S. provisional application Ser. No. 62/857,291, filed on Jun. 5, 2019 and China application serial no. 201910652960.9, filed on Jul. 19, 2019. The entirety of the above-mentioned patent application is hereby incorporated by reference herein and made a part of this specification.

BACKGROUND OF THE INVENTION

1. Field of the Invention

The invention generally relates to a heat dissipation module and a projection device, in particular, to a heat dissipation module with a relatively good heat dissipation effect and a projection device using the heat dissipation module.

2. Description of Related Art

In general, main heat sources in a projection device include a plurality of light sources and light valves. In a traditional heat transfer layout, these heat sources are respectively connected to heat dissipation modules for dissipating heat. Further, heat generated by the heat sources is conducted to heat dissipation fins by heat pipes, and then a fan is used to drive convection of air to dissipate the heat into the air. When a heat dissipation module is located above a heat source (i.e., in a horizontal direction), since liquid in a heat pipe in contact with the heat source is vaporized and upwards evaporated, and then is transmitted downwards to a contact end of the heat source after being condensed by the heat dissipation fins, a heat dissipation effect generated in combination with the gravity and this cycle is relatively good. On the contrary, if the heat source is located above the heat dissipation module (i.e., the projection device is placed upside down in an inverse gravity direction), a cycle in the inverse gravity direction is generated, so that the heat dissipation effect of the heat dissipation module is relatively poor. That is, if the placement direction of the projection device is changed, there is possibly a problem that the performance of the heat dissipation module is substantially reduced.

In order to solve the above problem that the heat dissipation efficiency is reduced by the change of the placement direction of the projection device, it is known that the probability of the problem caused by the reduction of the performance of the heat dissipation module in a specific direction is decreased by increasing the number of heat pipes or enlarging the volume of the heat dissipation module. However, the aforementioned design adds extra part expenses, and the size of the projection device is not effectively reduced, resulting in reduction of the product competitiveness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a heat dissipation module with a relatively good heat dissipation effect.

The invention is further directed to a protection device, including the aforementioned heat dissipation module and having relatively high product competitiveness.

Other objectives and advantages of the invention may be further understood from the technical features disclosed in the invention.

In order to achieve one or part or all of the aforementioned objectives or other objectives, one embodiment of the invention provides a heat dissipation module, configured to dissipate heat generated by at least one heating element of a projection device. The heat dissipation module includes at least one first heat pipe, at least one second heat pipe, and a heat dissipation fin assembly. The first heat pipe has a first section and a second section, and the first section is connected to the heating element. The second heat pipe has a third section and a fourth section, and the third section is connected to the heating element. A length of the first heat pipe is less than a length of the second heat pipe. The heat dissipation fin assembly includes a plurality of heat dissipation fins. The second section of the first heat pipe and the fourth section of the second heat pipe pass through the heat dissipation fin assembly, and the number of heat dissipation fins through which the second section of the first heat pipe passes is 70% or below of the number of heat dissipation fins through which the fourth section of the second heat pipe passes.

In order to achieve one or part or all of the aforementioned objectives or other objectives, one embodiment of the invention provides a projection device, including a housing, at least one heating element and a heat dissipation module. The heating element and the heat dissipation module are both disposed in the housing. The heat dissipation module is configured to dissipate heat generated by the heating element. The heat dissipation module includes at least one first heat pipe, at least one second heat pipe and a heat dissipation fin assembly. The first heat pipe has a first section and a second section, and the first section is connected to the heating element. The second heat pipe has a third section and a fourth section, and the third section is connected to the heating element. A length of the first heat pipe is less than a length of the second heat pipe. The heat dissipation fin assembly has a plurality of heat dissipation fins. The second section of the first heat pipe and the fourth section of the second heat pipe pass through the heat dissipation fin assembly, and a number of heat dissipation fins through which the second section of the first heat pipe passes is 70% or below of a number of heat dissipation fins through which the fourth section of the second heat pipe passes.

Based on the above, the embodiments of the invention at least have one of the following advantages or efficiencies. In the heat dissipation module of the invention, the length of the first heat pipe is less than that of the second heat pipe, and the number of heat dissipation fins through which the second section of the first heat pipe passes is 70% or below of the number of heat dissipation fins through which the fourth section of the second heat pipe passes. Compared with a traditional mode of increasing the number of heat pipes or enlarging the volume of the heat dissipation module, the invention enables the heat dissipation module of the invention to meet heat dissipation requirements in different projection directions by the difference of the lengths of the heat pipes and the proportion of the number of heat dissipation fins through which the heat pipes pass. In short, the heat dissipation module of the invention has a relatively good heat dissipation effect, and the projection device using the heat dissipation module of the invention has relatively high product competitiveness.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
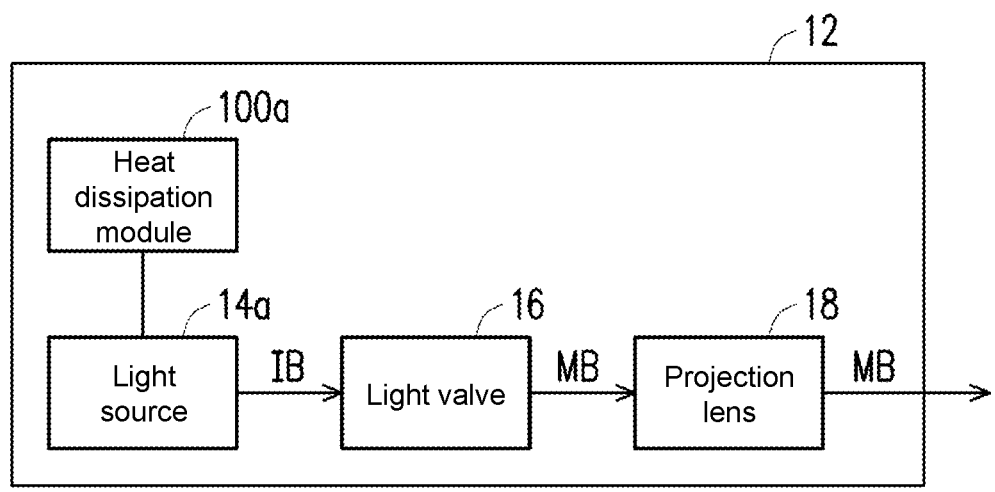
FIG. 1A is a schematic diagram of a projection device of one embodiment of the invention.
Figure 1B:
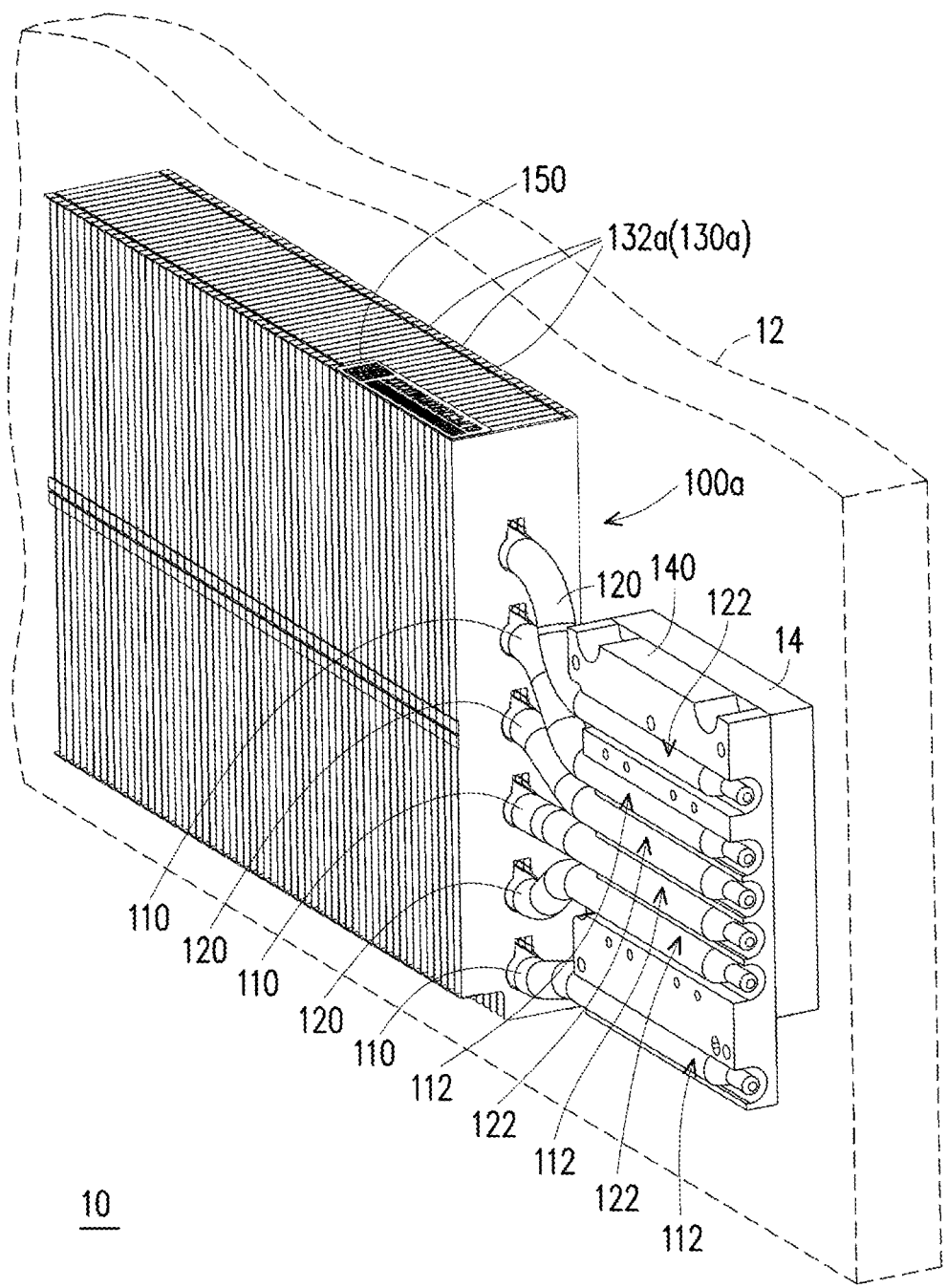
FIG. 1B is a partial schematic diagram of a projection device of one embodiment of the invention.

FIG. 1A is a schematic diagram of a projection device of one embodiment of the invention. FIG. 1B is a partial schematic diagram of a projection device of one embodiment of the invention. For the purpose of facilitating description, a housing in FIG. 1B is represented by dotted lines. Referring to FIG. 1B, the projection device 10 of the embodiment includes a housing 12, at least one heating element (one heating element 14 is schematically illustrated), and a heat dissipation module 100a. The heating element 14 and the heat dissipation module 100a are both disposed in the housing 12, and the heat dissipation module 100a is configured to dissipate heat generated by the heating element 14. As shown in FIG. 1A, the projection device 10 in the embodiment further includes a light source 14a, a light valve 16, and a projection lens 18 which are disposed in the housing 12. The heating element 14 of the projection device 10 is, for example, the light source 14a or the light valve 16, such as a laser light source, an LED (Light Emitting Diode) light source or a Digital Micro-mirror Device (DMD) in an optical engine, but is not limited thereto. As shown in FIG. 1A, the heat dissipation module 100a in the embodiment is, for example, disposed beside the light source 14a (the heating element). The light source 14a is configured to emit an illumination beam IB. The light valve 16 is disposed on a transmission path of the illumination beam IB, and is configured to convert the received illumination beam IB into an image beam MB. The projection lens 18 is disposed on a transmission path of the image beam MB generated from the light valve 16, and is configured to project the image beam MB to the outside of the projection device 10 and form an image (not shown) on a screen or wall surface. The light source 14a generates heat energy during operation, and a heat dissipation function is provided via the heat dissipation module 100a.

Figure 2A:
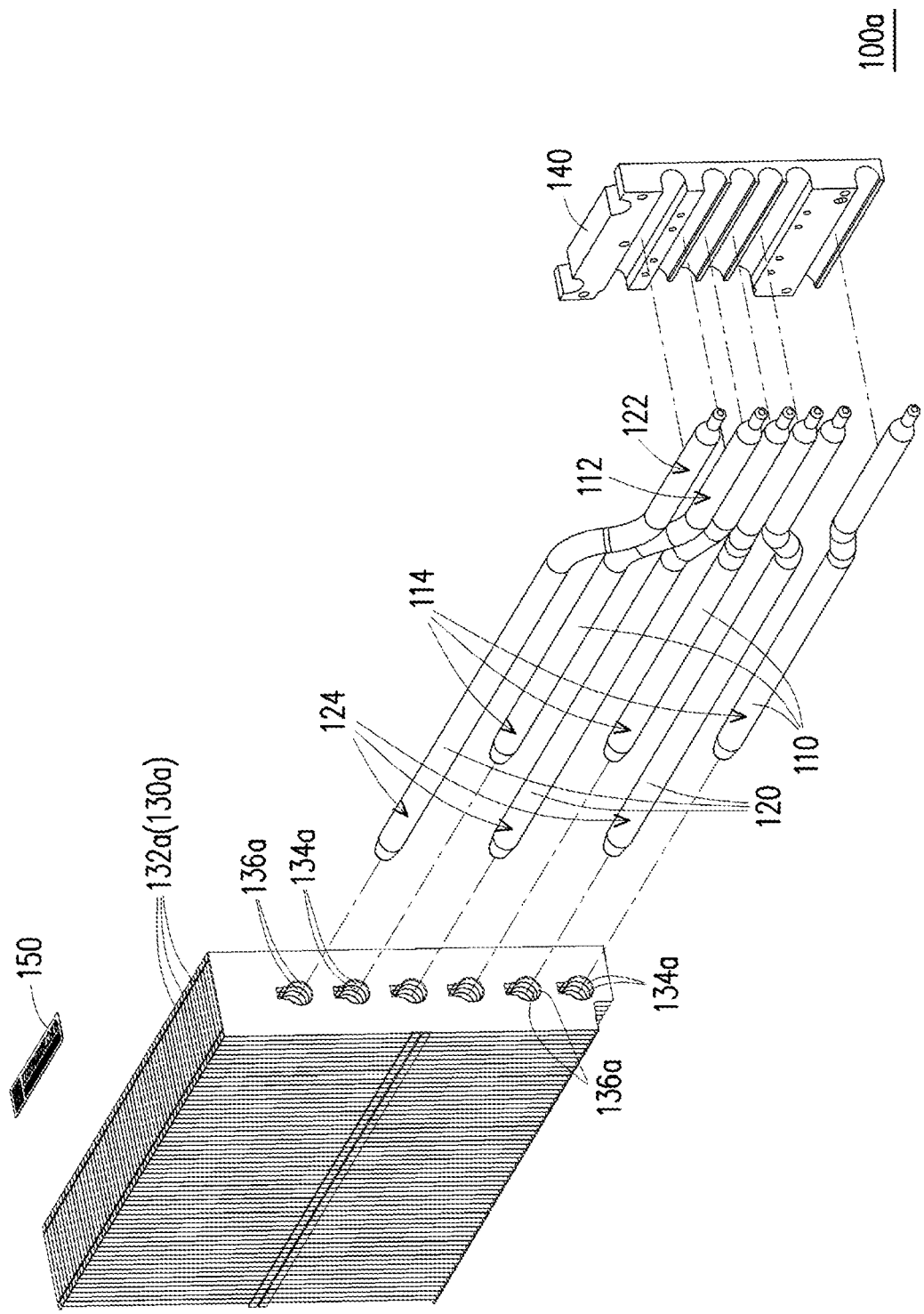
FIG. 2A is a three-dimensional exploded diagram of a heat dissipation module of the projection device of FIG. 1B.
Figure 2B:
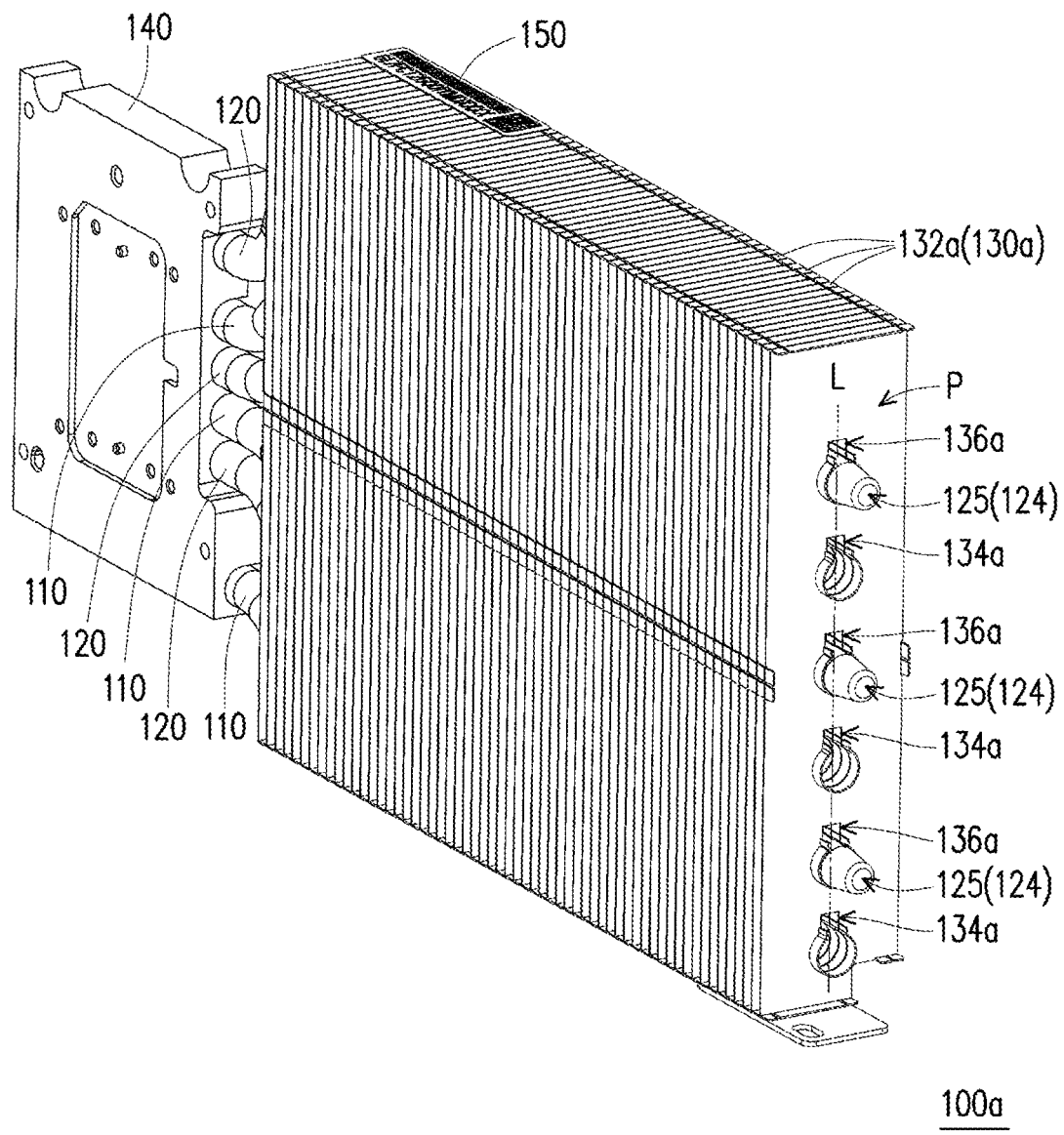
FIG. 2B is a three-dimensional diagram of the heat dissipation module of the projection device of FIG. 1B from another visual angle.
Figure 2C:
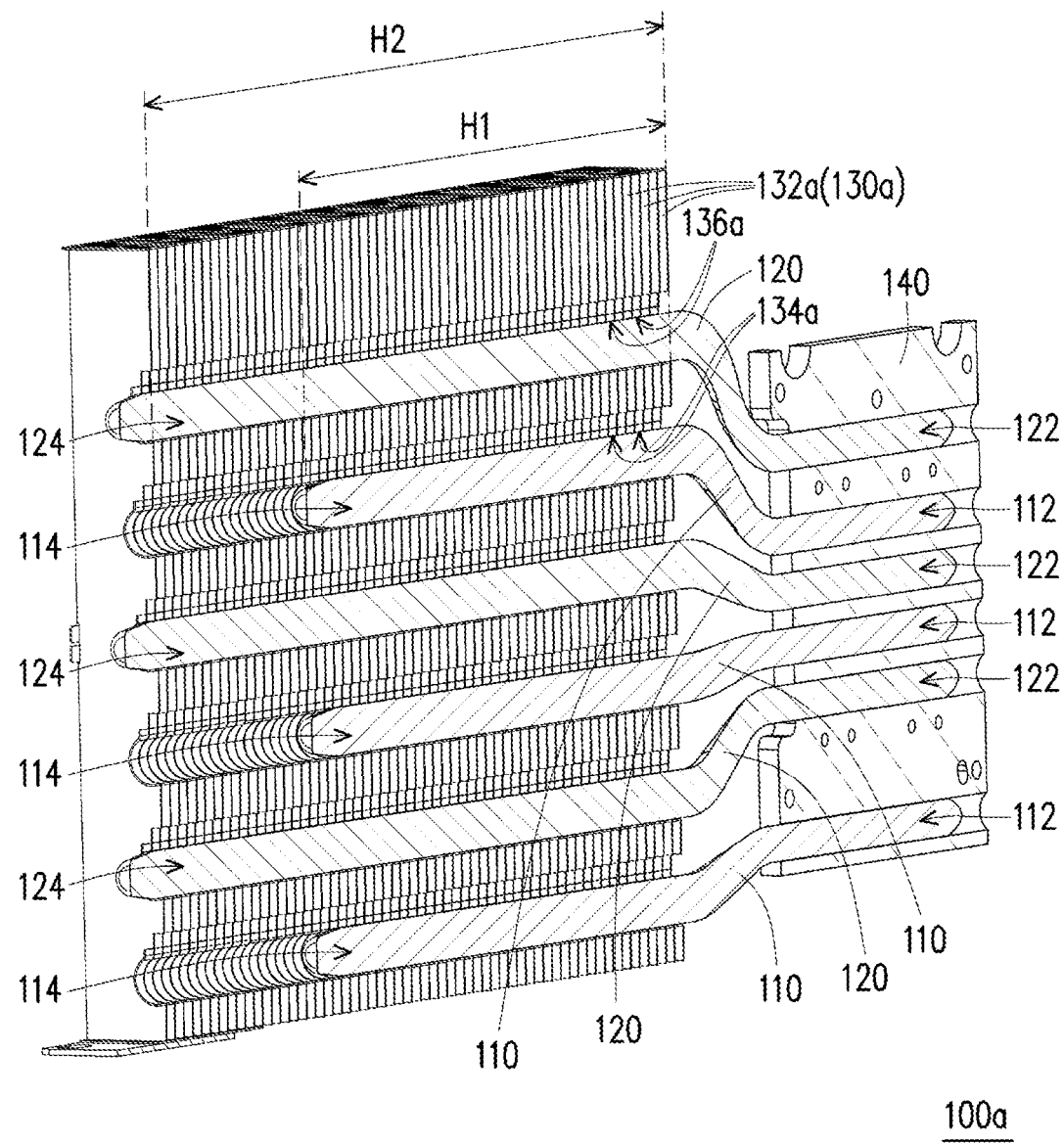
FIG. 2C is a three-dimensional cross-sectional diagram of the heat dissipation module of the projection device of FIG. 1B.

FIG. 2A is a three-dimensional exploded diagram of a heat dissipation module of the projection device of FIG. 1B. FIG. 2B is a three-dimensional diagram of the heat dissipation module of the projection device of FIG. 1B from another visual angle. FIG. 2C is a three-dimensional cross-sectional diagram of the heat dissipation module of the projection device of FIG. 1B. Referring to FIGS. 1B, 2A, 2B, and 2C together, the heat dissipation module 100a of the embodiment includes at least one first heat pipe (three first heat pipes 110 are schematically illustrated), at least one second heat pipe (three second heat pipes 120 are schematically illustrated) and a heat dissipation fin assembly 130a. Each of the first heat pipes 110 includes a first section 112 and a second section 114, and the first section 112 of each of the first heat pipes 110 is connected to the heating element 14. Each of the second heat pipes 120 includes a third section 122 and a fourth section 124, and the third section 122 of each of the second heat pipes 120 is connected to the heating element 14. That is, the first sections 112 of the first heat pipes 110 and the third sections 122 of the second heat pipes 120 are regarded as evaporation sections. The heat dissipation fin assembly 130a includes a plurality of heat dissipation fins 132a. The second section 114 of each of the first heat pipes 110 and the fourth section 124 of each of the second heat pipes 120 pass through the heat dissipation fin assembly 130a. That is, the second sections 114 of the first heat pipes 110 and the fourth sections 124 of the second heat pipes 120 are regarded as condensation sections. The plurality of heat dissipation fins 132a is, for example, arranged along a direction and disposed in parallel. The second sections 114 of the first heat pipes 110 and the fourth sections 124 of the second heat pipes 120, for example, pass through these heat dissipation fins 132a along the direction. In addition, the first section 112 and the second section 114 of each of the first heat pipes 110 are, for example, sections at two opposite ends of the corresponding heat pipe, and the third section 122 and the fourth section 124 of each of the second heat pipes 120 are, for example, sections at two opposite ends of the corresponding heat pipe, but the invention is not limited thereto. In addition, the first heat pipes 110 and the second heat pipes 120 are, for example, arranged alternately. Furthermore, the first heat pipes 110 and the second heat pipes 120 are alternately arranged along a direction perpendicular to an arranging direction of plurality of heat dissipation fins 132a, but the invention is not limited thereto.

Particularly, a length H1 of the first heat pipes 110 of the embodiment is less than a length H2 of the second heat pipes 120. It should be noted that the length H1 of the first heat pipes 110 here refers to a distance between the first heat dissipation fin 132a through which the first heat pipes 110 pass and the last heat dissipation fin 132a through which the first heat dissipation pipes 110 pass. Similarly, the length H2 of the second heat pipes 120 here refers to a distance between the first heat dissipation fin 132a through which the second heat pipes 120 pass and the last heat dissipation fin 132a through which the second heat dissipation pipes 120 pass. Preferably, the number of heat dissipation fins 132a through which the second sections 114 of the first heat pipes 110 pass is 70% or below of the number of heat dissipation fins through which the fourth sections 124 of the second heat pipes 120 pass. That is, the number of heat dissipation fins 132a through which the second sections 114 of the first heat pipes 110 pass is less than the number of heat dissipation fins through which the fourth sections 124 of the second heat pipes 120 pass. For example, if the fourth sections 124 of the second heat pipes 120 pass through 100 heat dissipation fins 132a, the second sections 114 of the first heat pipes 110 pass through 70 or below 70 heat dissipation fins 132a. Herein, the length H1 of the first heat pipes 110 is specifically 50 mm to 120 mm, and the length H2 of the second heat pipes 120 is specifically 150 mm to 350 mm. However, the length H1 of the first heat pipes 110 and the length H2 of the second heat pipes 120 are, for example, adjusted according to a space actually disposed in the projection device, and the invention is not limited thereto.

More specifically, the heat dissipation fin assembly 130a of the embodiment includes a plurality of first through holes 134a and a plurality of second through holes 136a which entirely penetrate through the heat dissipation fins 132a. The second section 114 of each of the first heat pipes 110 is located in a corresponding first through hole 134a. The fourth section 124 of each of the second heat pipes 120 passes through a corresponding second through hole 136a, and an end portion 125 of each of the fourth sections 124 is exposed outside the heat dissipation fin assembly 130a. That is, in the embodiment, only the fourth sections 124 of the second heat pipes 120 pass through all the heat dissipation fins 132a, and the second sections 114 of the first heat pipes 110 pass through part of the heat dissipation fins 132a. Each of the heat dissipation fins 132a includes both the first through holes 134a and the second through holes 136a. Herein, the plurality of first through holes 134a and the plurality of second through holes 136a of each of the heat dissipation fins 132a are arranged into a straight line L on a reference plane P, and the reference plane P is parallel to any one of the heat dissipation fins 132a. The straight line L is perpendicular to the arranging direction of plurality of heat dissipation fins 132a, but the invention is not limited thereto.

Furthermore, in order to effectively position the first heat pipes 110, the second heat pipes 120 and the heating element 14, the heat dissipation module 100a of the embodiment further includes a fixed frame 140. The first section 112 of each of the first heat pipes 110 and the third section 122 of each of the second heat pipes 120 are assembled on the fixed frame 140, and are connected to the heating element 14 through the fixed frame 140. That is, the fixed frame 140 is located among the heating element 14, the first sections 112 of the first heat pipes 110 and the third sections 122 of the second heat pipes 120. In addition, the heat dissipation module 100a further includes a label layer 150, disposed on the heat dissipation fin assembly 130a and configured to mark related information of the heat dissipation module 100a.

In one simulated embodiment, the known heat dissipation module has a maximum heat transfer amount of 320 W in the horizontal direction and a maximum heat transfer amount of 90 W in the inverse gravity direction, and has the volume flow per minute of 27 CFM (ft$^3$/min). The heat dissipation module 100a of the embodiment has a maximum heat transfer amount of 320 W in the horizontal direction and a maximum heat transfer amount of 160 W in the inverse gravity direction, and has the volume flow per min of 29.3 CFM. That is, compared with the known heat dissipation module, the heat dissipation module 100a of the embodiment increases the flow by 8.5%.

Since the length H1 of the first heat pipes 110 of the embodiment and the length H2 of the second heat pipes 120 are different, the heat dissipation capacity of the first heat pipes 110 is also different from that of the second heat pipes 120. Furthermore, the second heat pipes 120 which are relatively longer than the first heat pipes 110 pass through more heat dissipation fins 132a, and thus have a relatively large heat dissipation area. Therefore, due to different lengths of the first heat pipes 110 and the second heat pipes 120 and the alternate arrangement of the first heat pipes 110 and the second heat pipes 120, the heat dissipation module 100a of the embodiment has the same or similar performance when placed at different angles, namely the heat dissipation module 100a simultaneously meets performance requirements in the horizontal direction and the inverse gravity direction.

In addition, in order to further enhance the heat dissipation effect of the first heat pipes 110 and the second heat pipes 120, under the condition that the first heat pipes 110 and the second heat pipes 120 have the same pipe diameters, capillary structures (not shown) in the first heat pipes 110 is different from capillary structures (not shown) in the second heat pipes 120. The capillary structures are, for example, sintered capillary structures, groove capillary structures or compound capillary structures, and are not limited therein. Of course, in other embodiments, under the condition that the first heat pipes 110 and the second heat pipes 120 have different pipe diameters, the capillary structures (not shown) in the first heat pipes 110 and the capillary structures (not shown) in the second heat pipes 120 are in the same form, which still falls within the protection scope of the invention.

In short, the heat dissipation module 100a of the embodiment meets the heat dissipation requirements for the projection device 10 disposed in various projection directions without adding extra heat pipes or enlarging the volume of the heat dissipation fins. Furthermore, the heat dissipation module 100a of the embodiment still increases the maximum heat transfer amount (Q max) in the inverse gravity direction without a new die under the existing design. That is, the performance difference of the heat dissipation module 100a of the embodiment in various projection directions is reduced. In addition, the heat dissipation module 100a of the embodiment also effectively reduces flow resistance and noise.

It must be noted that the following embodiments use the element reference numerals and partial contents of the foregoing embodiments. The same or similar reference numerals are used to represent the same or similar elements, and the description of the same technical content is omitted. The descriptions of the omitted parts are made reference to the foregoing embodiments, and are omitted in the following embodiments.

Figure 3:
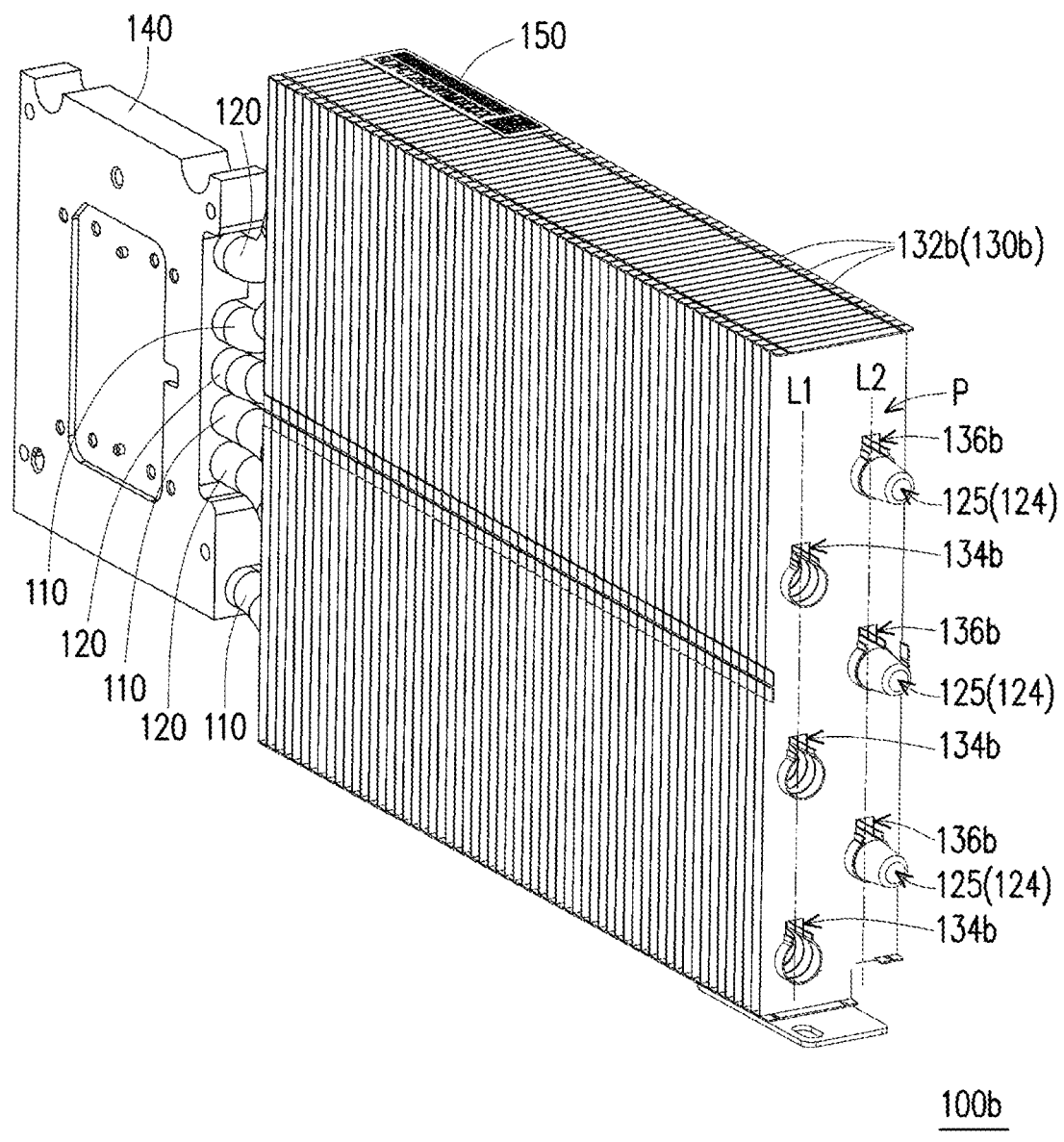
FIG. 3 is a three-dimensional diagram of a heat dissipation module of another embodiment of the invention.

FIG. 3 is a three-dimensional diagram of a heat dissipation module of another embodiment of the invention. Referring to FIGS. 2B and 3 together, a heat dissipation module 100b of the embodiment is similar to the heat dissipation module 100a of FIG. 2B, and a difference therebetween is that a plurality of first through holes 134b of each of heat dissipation fins 132b in a heat dissipation fin assembly 130b of the embodiment are arranged into a first straight line L1 on the reference plane P, and a plurality of second through holes 136b of each of the heat dissipation fins 132b are arranged into a second straight line L2 on the reference plane P. Preferably, the first straight line L1 is parallel to the second straight line L2, and the first straight line L1 does not overlap the second straight line L2, and the reference plane P is parallel to any one of the heat dissipation fins 132b. The first straight line L1 and the second straight line L2 are perpendicular to the arranging direction of plurality of heat dissipation fins 132a. That is, the first through holes 134b and the second through holes 136b are alternately arranged, but not arranged on the same straight line.

Figure 4A:
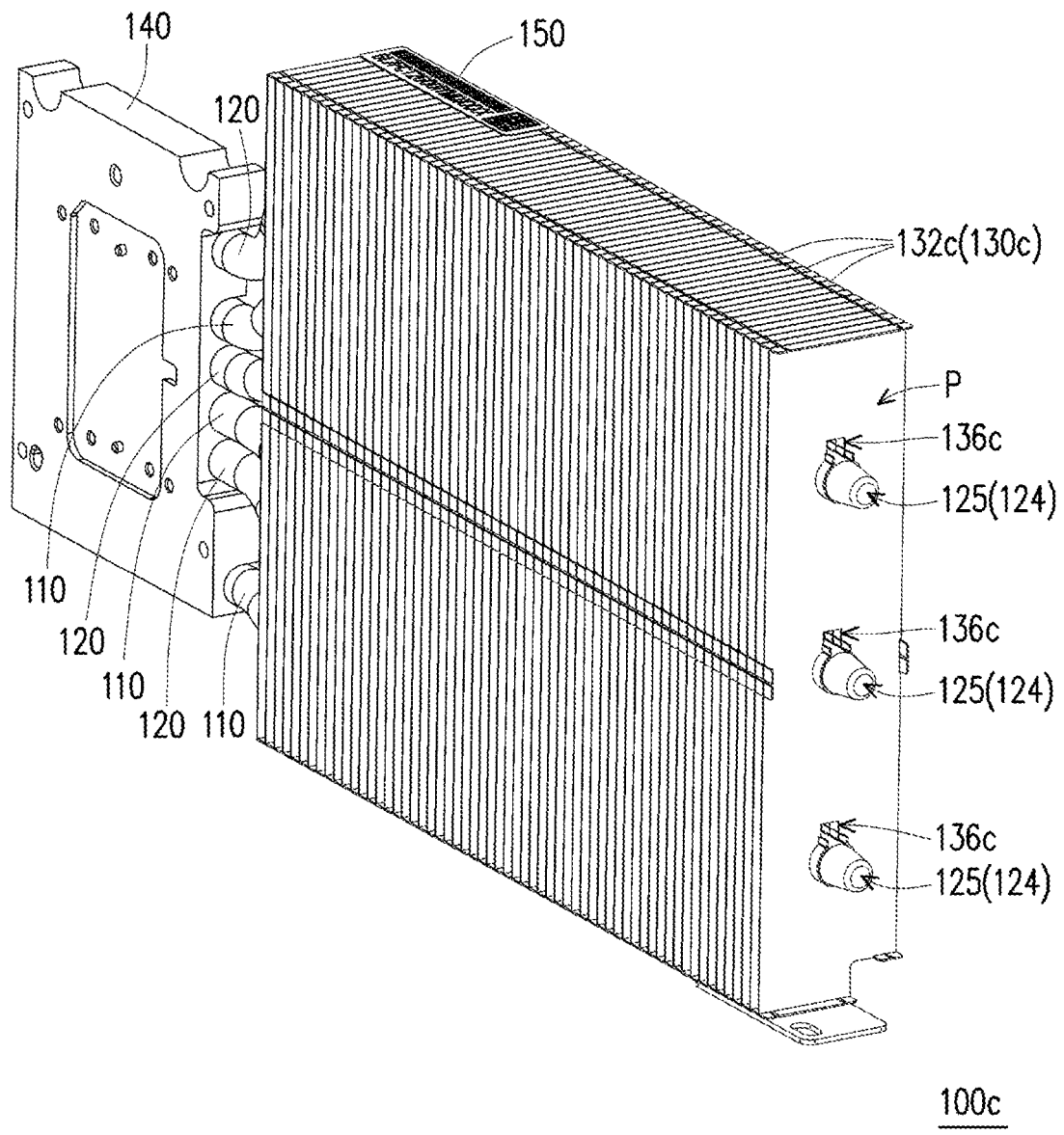
FIG. 4A is a three-dimensional diagram of a heat dissipation module of another embodiment of the invention.
Figure 4B:
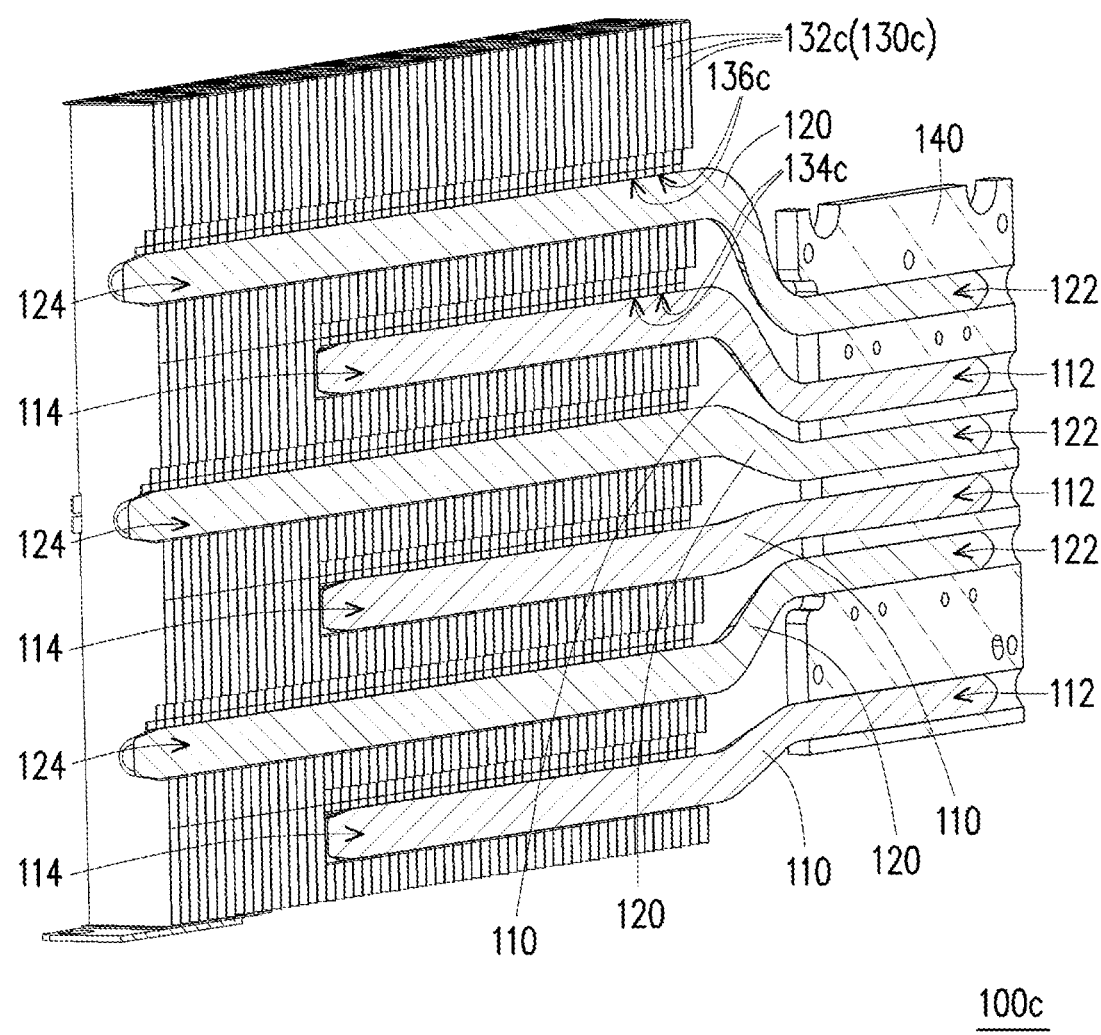
FIG. 4B is a three-dimensional cross-sectional diagram of the heat dissipation module of FIG. 4A.

FIG. 4A is a three-dimensional diagram of a heat dissipation module of another embodiment of the invention. FIG. 4B is a three-dimensional cross-sectional diagram of the heat dissipation module of FIG. 4A. Referring to FIGS. 2B, 2C, 4A, and 4B together, a heat dissipation module 100c of the embodiment is similar to the heat dissipation module 100a of FIG. 2B, and a difference therebetween is that a heat dissipation fin assembly 130c of the embodiment includes a plurality of first through holes 134c and a plurality of second through holes 136c. The first through holes 134c penetrate through part of the heat dissipation fins 132c, and the second through holes 136c entirely penetrate through all the heat dissipation fins 132c. The second section 114 of each of the first heat pipes 110 is located in the corresponding first through hole 134c. The fourth section 124 of each of the second heat pipes 120 passes through the corresponding second through hole 136c, and the end portion 125 of each of the fourth sections 124 is exposed outside the heat dissipation fin assembly 130c. That is, in the embodiment, only the fourth sections 124 of the second heat pipes 120 pass through all the heat dissipation fins 132c. Each of the heat dissipation fins 132c includes the second through holes 136c, and only part of the heat dissipation fins 132c includes both the first through holes 134c and the second through holes 136c. Therefore, the last heat dissipation fin 132a or the reference plane P includes the second through holes 136c only and includes no first through holes 134c.

Based on the above, the embodiments of the invention at least have one of the following advantages or effects. In the heat dissipation module of the invention, the length of the first heat pipes is less than that of the second heat pipes, and the number of heat dissipation fins through which the second sections of the first heat pipes pass is 70% or below of the number of heat dissipation fins through which the fourth sections of the second heat pipes pass. Compared with a traditional mode of increasing the number of heat pipes or enlarging the volume of the heat dissipation module, the invention enables the heat dissipation module of the invention to meet heat dissipation requirements for the projection device disposed in different projection directions by the difference of the lengths of the heat pipes and the proportion of the number of heat dissipation fins through which the heat pipes pass. In short, the heat dissipation module of the invention has a relatively good heat dissipation effect, and the projection device using the heat dissipation module of the invention has relatively high product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A heat dissipation module, configured to dissipate heat generated by at least one heating element of a projection device, the heat dissipation module comprising at least one first heat pipe, at least one second heat pipe, and a heat dissipation fin assembly, wherein the at least one first heat pipe has a first section and a second section, and the first section is connected to the at least one heating element;

the at least one second heat pipe has a third section and a fourth section, the third section is connected to the at least one heating element, and a length of the at least one first heat pipe is less than a length of the at least one second heat pipe, and the heat dissipation fin assembly comprises a plurality of heat dissipation fins, wherein the second section of the at least one first heat pipe and the fourth section of the at least one second heat pipe pass through the heat dissipation fin assembly, and a number of heat dissipation fins through which the second section of the at least one first heat pipe passes is 70% or below of a number of heat dissipation fins through which the fourth section of the at least one second heat pipe passes, wherein the first section of the at least one first heat pipe does not contact the plurality of heat dissipation fins, and the third section of the at least one second heat pipe does not contact the plurality of heat dissipation fins.

2. The heat dissipation module according to claim 1, wherein the length of the at least one first heat pipe is 50 mm to 120 mm.

3. The heat dissipation module according to claim 1, wherein the length of the at least one second heat pipe is 150 mm to 350 mm.

4. The heat dissipation module according to claim 1, wherein the at least one first heat pipe comprises a plurality of first heat pipes, the at least one second heat pipe comprises a plurality of second heat pipes, and the plurality of first heat pipes and the plurality of second heat pipes are alternately arranged.

5. The heat dissipation module according to claim 4, wherein the heat dissipation fin assembly has a plurality of first through holes and a plurality of second through holes which penetrate through the plurality of heat dissipation fins; the second sections of the plurality of first heat pipes are located in the plurality of corresponding first through holes, the fourth sections of the plurality of second heat pipes pass through the plurality of corresponding second through holes, and an end portion of the fourth sections is exposed outside the heat dissipation fin assembly.

6. The heat dissipation module according to claim 5, wherein the plurality of first through holes and the plurality of second through holes are arranged into a straight line on a reference plane, and the reference plane is parallel to any one of the plurality of heat dissipation fins.

7. The heat dissipation module according to claim 5, wherein the plurality of first through holes are arranged into a first straight line on a reference plane, and the plurality of second through holes are arranged into a second straight line on the reference plane, the first straight line is parallel to the second straight line, and the reference plane is parallel to any one of the plurality of heat dissipation fins.

8. The heat dissipation module according to claim 4, wherein the heat dissipation fin assembly has a plurality of first through holes and a plurality of second through holes, the plurality of first through holes penetrate through part of the plurality of heat dissipation fins, the plurality of second through holes penetrate through all the plurality of heat dissipation fins, the second sections of the plurality of first heat pipes are located in the plurality of corresponding first through holes, the fourth sections of the plurality of second heat pipes pass through the plurality of corresponding second through holes, and an end portion of each of the fourth sections is exposed outside the heat dissipation fin assembly.

9. The heat dissipation module according to claim 1, further comprising:

a fixed frame, wherein the first section of each of the at least one first heat pipe and the third section of each of the at least one second heat pipe are assembled on the fixed frame and are connected to the at least one heating element through the fixed frame.

10. The heat dissipation module according to claim 1, further comprising:

a label layer, disposed on the heat dissipation fin assembly.

11. A projection device, comprising a housing, at least one heating element, and a heat dissipation module, wherein the at least one heating element is disposed in the housing, and the heat dissipation module is disposed in the housing and configured to dissipate heat generated by the at least one heating element, and the heat dissipation module comprises at least one first heat pipe, at least one second heat pipe, and a heat dissipation fin assembly, wherein the at least one first heat pipe has a first section and a second section, the first section is connected to the at least one heating element, the at least one second heat pipe has a third section and a fourth section, the third section is connected to the at least one heating element, and a length of the at least one first heat pipe is less than a length of the at least one second heat pipe, and the heat dissipation fin assembly comprises a plurality of heat dissipation fins, wherein the second section of the at least one first heat pipe and the fourth section of the at least one second heat pipe pass through the heat dissipation fin assembly, and a number of heat dissipation fins through which the second section of the at least one first heat pipe passes is 70% or below of a number of heat dissipation fins through which the fourth section of the at least one second heat pipe passes, wherein the first section of the at least one first heat pipe does not contact the plurality of heat dissipation fins, and the third section of the at least one second heat pipe does not contact the plurality of heat dissipation fins.

12. The projection device according to claim 11, wherein the length of the at least one first heat pipe is 50 mm to 120 mm.

13. The projection device according to claim 11, wherein the length of the at least one second heat pipe is 150 mm to 350 mm.

14. The projection device according to claim 11, wherein the at least one first heat pipe comprises a plurality of first heat pipes, the at least one second heat pipe comprises a plurality of second heat pipes, and the plurality of first heat pipes and the plurality of second heat pipes are alternately arranged.

15. The projection device according to claim 14, wherein the heat dissipation fin assembly has a plurality of first through holes and a plurality of second through holes which penetrate through the plurality of heat dissipation fins, the second sections of the plurality of first heat pipes are located in the plurality of corresponding first through holes, the fourth sections of the plurality of second heat pipes pass through the plurality of corresponding second through holes, and an end portion of each of the fourth sections is exposed outside the heat dissipation fin assembly.

16. The projection device according to claim 15, wherein the plurality of first through holes and the plurality of second through holes are arranged into a straight line on a reference plane, and the reference plane is parallel to any one of the plurality of heat dissipation fins.

17. The projection device according to claim 15, wherein the plurality of first through holes are arranged into a first straight line on a reference plane, the plurality of second through holes are arranged into a second straight line on the reference plane, the first straight line is parallel to the second straight line, and the reference plane is parallel to any one of the plurality of heat dissipation fins.

18. The projection device according to claim 14, wherein the heat dissipation fin assembly has a plurality of first through holes and a plurality of second through holes, the plurality of first through holes penetrate through part of the plurality of heat dissipation fins, the plurality of second through holes penetrate through all the plurality of heat dissipation fins, the second sections of the plurality of first heat pipes are located in the plurality of corresponding first through holes, the fourth sections of the plurality of second heat pipes pass through the plurality of corresponding second through holes, and an end portion of each of the fourth sections is exposed outside the heat dissipation fin assembly.

19. The projection device according to claim 11, wherein the heat dissipation module further comprises:
a fixed frame, wherein the first section of each of the at least one first heat pipe and the third section of each of the at least one second heat pipe are assembled on the fixed frame and are connected to the at least one heating element through the fixed frame.

20. The projection device according to claim 11, wherein the heat dissipation module further comprises:
a label layer, disposed on the heat dissipation fin assembly.

* * * * *